May 1, 1956 W. H. BOYD 2,743,701
ANIMAL HOIST
Filed June 7, 1954
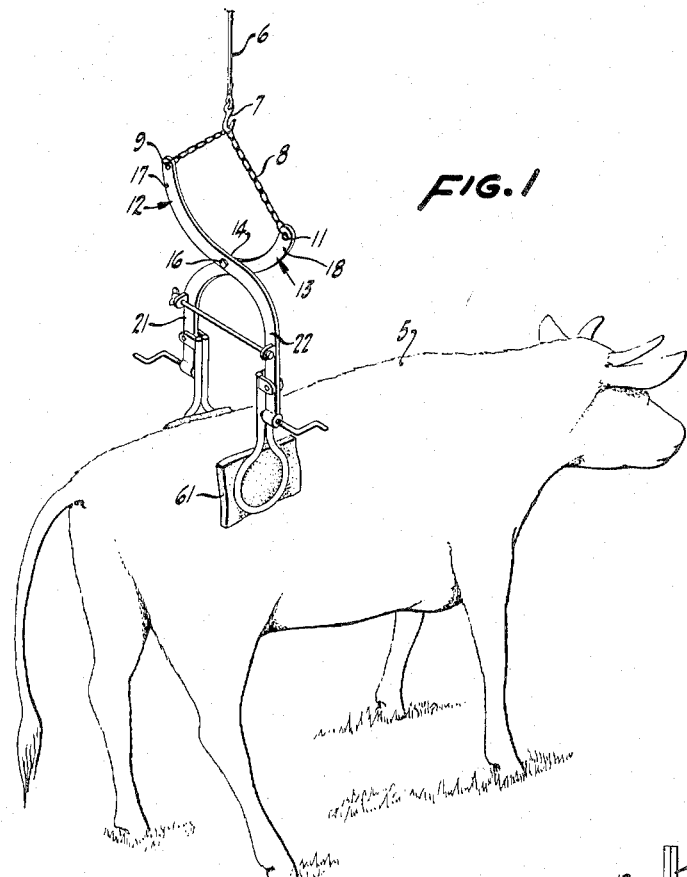
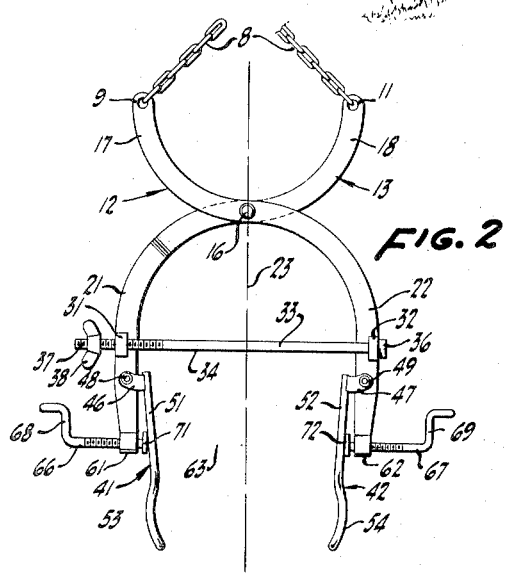
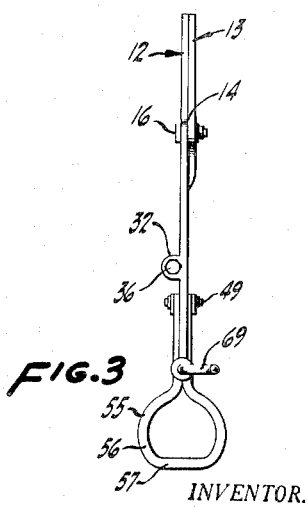
INVENTOR.
WILLIAM H. BOYD
BY *Maurer Lothrop*
ATTORNEY

# United States Patent Office 2,743,701
Patented May 1, 1956

2,743,701

ANIMAL HOIST

William H. Boyd, Sacramento, Calif.

Application June 7, 1954, Serial No. 434,781

1 Claim. (Cl. 119—100)

My invention relates to hoists for lifting animals and especially to hoists for lifting sick animals and animals such as cattle whose anatomy is such as to render unsuitable hoists of the belly girth type.

A problem frequently encountered in the field of animal husbandry, especially in cattle raising, is the loss by death of the female animal subsequent to bearing its young. Many cows, for example, become partially paralyzed in their posterior extremities, apparently as a result of pressure on the operator nerves brought about by the calving effort. Normal blood circulation is impeded, the animal's partial paralysis and general condition becomes progressively worse and after a period of dwindling away, usually no longer than three of four weeks, death occurs. It has been found that if the cow stricken by paralysis can be raised to its normal walking position, and its posterior supported to permit the cow to walk about in normal fashion, pinching of the operator nerves is relieved, circulation is restored and complete recovery is frequently effected.

Best results are obtained where the cow is lifted and supported in its natural or normal position. Owing to the anatomy of many animals, particularly those of the cattle family, a hoist of the belly girth type, that is, a band or harness bearing upwardly against the animal's belly, is unsuitable. A cow, for example, has its multiple stomachs located in the belly area, the stomachs being relatively soft and yielding to external pressures. A belly girth, pulling upwardly, humps the cow's mid-section, and causes the front and posterior ends of the animal to droop or sag downwardly in an abnormal manner, unsuitable for natural walking about and not at all conducive to relief of the pinched operator nerves and the circulatory disorders caused thereby. In addition, hoists of the belly girth type cause considerable discomfort to an animal and render treatment difficult. Furthermore, for purposes of examination, diagnosis and treatment, as by a veterinarian, of disorders such as fractures, lesions and injuries of many kinds, positioning of the animal in its normal standing attitude is greatly to be desired.

It is therefore an object of my invention to provide an animal hoist which enables a large and heavy animal, such as a cow, to be lifted to a walking position in which the animal's posture is normal.

It is yet another object of my invention to provide an animal hoist which can be easily applied to an animal when the animal is in a lying down position.

It is a still further object of my invention to provide an animal hoist which will not harm or hurt the animal upon which it is used.

It is another object of my invention to provide an animal hoist which is economical to manufacture and which can be easily used even by unskilled labor.

Other objects, together with the foregoing, are obtained in the embodiment of my invention described in the following description and shown in the accompanying figures, in which:

Figure 1 is a perspective view of my animal hoist applied to the hip bones of a cow.

Figure 2 is a front elevation of the hoist of my invention.

Figure 3 is a side elevation thereof.

The lifting force on the animal hoist and upon the animal 5, such as a cow, held thereby is exerted by a cable 6 leading upwardly to a suitable block and tackle or winch arrangement (not shown), the cable being long enough vertically to permit the animal to take several steps in any direction from the point on the ground below the hoist. At the lower end of the cable 6 is fastened a hook 7 in engagement with a chain 8 having its opposite ends fastened in suitable apertures 9 and 11 adjacent the upper ends of a pair of levers 12 and 13, respectively, the levers being in crossed relationship and pivotally mounted with respect to each other at their intersection 14, as by a pivot pin 16.

The upward force exerted by the cable 6 and the hook 7 on the chain 8 tends to urge together the upper arms 17 and 18 of the levers and concurrently, owing to the crossing relationship of the levers, the lower arms 21 and 22 of the levers tend to be forced inwardly or toward each other. Preferably, the lower arms 21 and 22 are bowed outwardly and downwardly and are conveniently symmetrical about a vertical axis 23. At their upper ends, the arms 21 and 22 are arcuate in shape and have radii of curvature sufficiently large so that at the lower portions of the arms 21 and 22 the space existing between the arms is adequate to straddle the hips of any beast customarily handled by the hoist of my invention.

Mounted on corresponding sides of the lower arms 21 and 22 is a pair of bosses 31 and 32, respectively, the bosses being pierced by suitable apertures disposed on a transverse axis 33. Extending through the apertures in the bosses is a tie rod 34 coaxial with the axis 33, the rod 34 having a nut 36 at one end in abutment with the boss 32 and being provided at its other end with suitable screw threads 37. A nut 38, such as a butterfly nut, for example, is placed in threaded engagement with the threads 37, and upon being taken up urges the two arms 21 and 22 together. The tie rod 34 and its attendant structure furnishes the veterinarian or other user of the device a mechanism for clamping the lower arms 21 and 22 together on each side of the animal to be treated, the lower arms 21 and 22 being first located so as to extend downwardly on each side of the animal in the area of its hip bones; the nut 38 then being taken up so as to urge the lower arms 21 and 22 toward each other.

The structure used to grip or clamp the hip bones of an animal, such as a cow, for example, includes a pair of clamps 41 and 42 pivotally mounted adjacent the lower ends of the arms 21 and 22 as by suitable bifurcated brackets 46 and 47, respectively, the brackets straddling the adjacent lower arms and being connected thereto by pivot pins 48 and 49, respectively, inserted in suitable apertures in the corresponding arms and disposed about parallel horizontal axes normal to the axis 33 of the tie rod. Mounted on each of the brackets 46 and 47 and depending therefrom is a corresponding pair of clamp bars 51 and 52, respectively, the lower portions of each of the clamping bars being bowed laterally outwardly, as most clearly appears in Figure 2, to form arcuate portions 53 and 54, respectively. As most clearly appears in Figure 3, the arcuate portions 53 and 54 are not only bowed outwardly in a lateral or transverse direction but are also fabricated so as to form a substantially circular ring 55 having an interior contour 56, the ring lying in a generally fore and aft plane. Preferably the bottom portion of the ring 55 has a somewhat flattened portion 57 better to fit the hip bone projection. The clamps 51 and 52 are made easily connectable and disconnectable from the lever arms since the particular contours and dimensions of the bowed portions 53 and 54 and the size and conformation of the portions 56 and 57 of the ring 55 should conform to the particular animal, a number of different sizes and shapes of clamp pairs being carried by the veterinarian in order to handle a variety of animals as well as to fit different sizes and weights of animals of any one kind.

Since the clamps 51 and 52 would ordinarily be of some hard material, such as steel, in order to protect the hide covering the wings of the pelvis of the animal being treated, a buffer pad 61 is customarily inserted between the clamp and the hide at the area of contact. The pad 61 can conveniently be of material such as foam rubber which will prevent abrasion of the animal's hide but will permit the hip bone mound to protrude outwardly into and through the ring 55. It is the ring 55 carefully contoured to the projecting mound supported by the pelvic wings which effects the actual lifting of the animal. It is therefore important that each of the rings be pressed tightly against the base of the mound. To accomplish this clamping effect, I provide at the lower extremity of the arms 21 and 22 an enlarged portion or boss 61 and 62, respectively, the boss having apertures therein coaxial about a transverse axis 63. The apertures are threaded, and in engagement therewith are correspondingly threaded stems 66 and 67, respectively, having suitable mechanism for turning the stem, such as crank handles 68 and 69, respectively. Mounted on the inner ends of the stems are disks 71 and 72, respectively, for engagement with the corresponding adjacent clamps 51 and 52, the disks being movable inwardly toward each other by suitable manipulation of the cranks 68 and 69. The clamps are ordinarily tightened up subsequent to the tightening up of the lever arms 21 and 22 effected by the tie rod nut 38, the clamps serving as a fine adjustment and tilting the bowed rings inwardly around the mounds. Individual adjustment of the clamps allows the user to tilt the clamps to the angle most suitable for the anatomy of the particular animal being treated.

When the clamps have been tightened, the cable 6 is raised; the clamps in turn lift the animal and when the animal is in normal walking position the cable is made fast. The animal is then able to walk around within a restricted range within the control of the user.

What is claimed is:

An animal hoist comprising a substantially centrally pivoted pair of tongs, the lower portion of said tongs including a pair of outwardly bowed arms, each of said arms including an internally threaded boss at the lower extremity thereof, a pair of clamps pivotally mounted on opposite sides of said arms and extending downwardly beyond said bosses, each of said clamps including a linear portion and an arcuate portion, and means engageable in said bosses and in abutment with said linear portions for urging said clamps toward each other.

References Cited in the file of this patent
UNITED STATES PATENTS

| | | |
|---|---|---|
| 103,585 | Dohn | May 31, 1870 |
| 130,943 | Pyle | Aug. 27, 1872 |
| 546,999 | Cunningham | Oct. 1, 1895 |
| 554,714 | Murphy | Feb. 18, 1896 |
| 1,012,165 | Schimke | Dec. 19, 1911 |
| 1,189,107 | Hescock | June 27, 1916 |
| 2,100,497 | White | Nov. 20, 1937 |
| 2,655,900 | Basler et al. | Oct. 20, 1953 |